June 1, 1965   W. A. ROHDE   3,186,628
PACKAGING

Filed March 27, 1964   2 Sheets-Sheet 1

INVENTOR
WILLIAM A. ROHDE by: Dawy, Parker, Juettner & Cullinan
ATTYS.

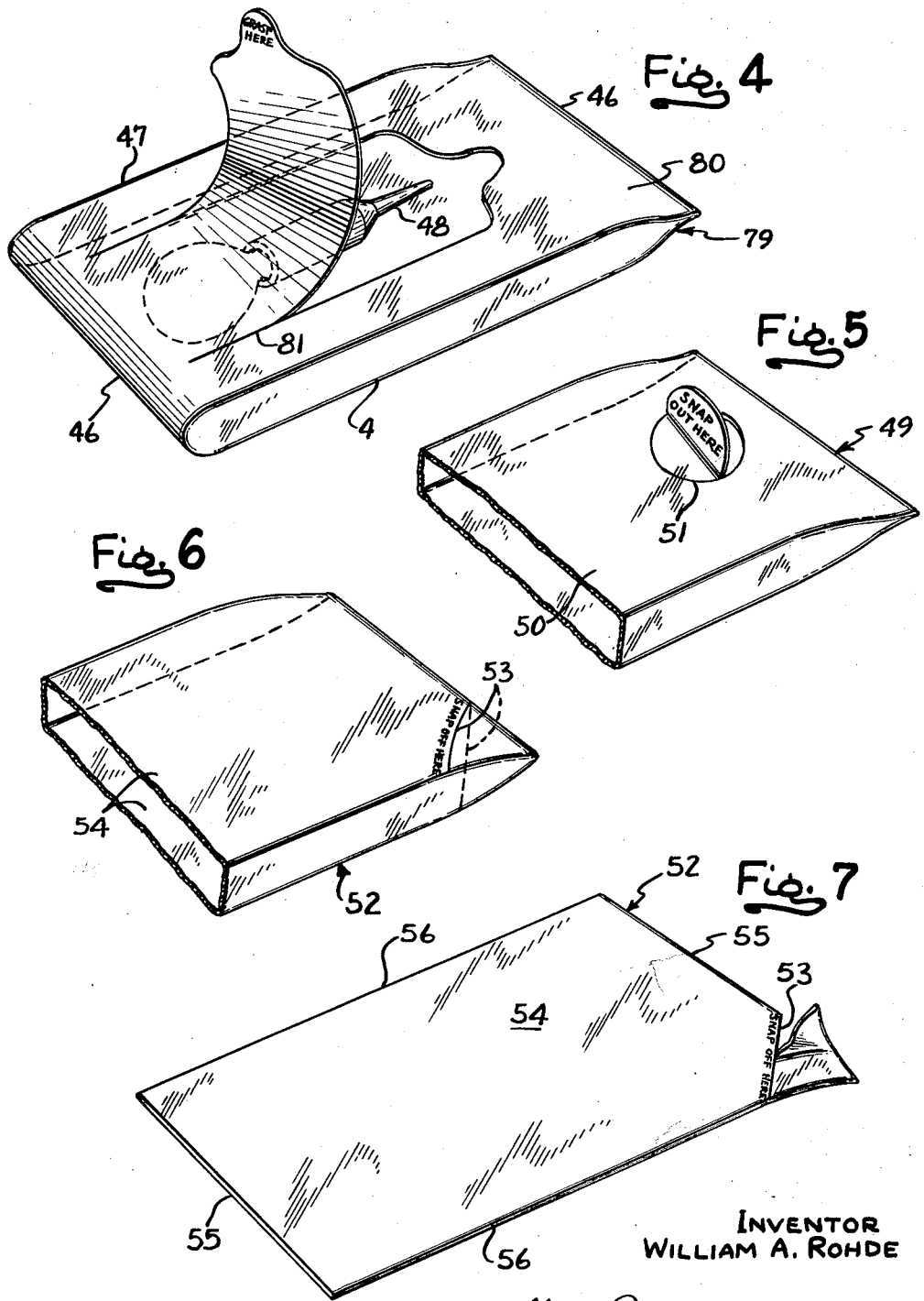

United States Patent Office 3,186,628
Patented June 1, 1965

3,186,628
PACKAGING
William A. Rohde, Wheeling, Ill., assignor to Tower Packaging Company, Wheeling, Ill., a corporation of Illinois
Filed Mar. 27, 1964, Ser. No. 356,354
7 Claims. (Cl. 229—66)

This application is a continuation-in-part of my co-pending application, Serial No. 258,785, filed February 15, 1963, now abandoned.

This invention relates to the production of novel packaging material.

More particularly the present invention relates to the production of flexible plastic films or sheet material suitable for packaging use composed of thermoplastic materials such as polyethylene, polypropylene, cellulose acetate, nylon, vinyl resins such as polyvinylidene chloride (saran), polyvinyl chloride, polyvinyl acetate and their mixtures or copolymers and the like film forming resin materials, and wherein the thermoplastic film is formed with means for facilitating the opening of sealed packages produced therefrom. These may be employed alone or supported as by lamination to other films or sheet material such as paper, regenerated cellulose (cellophane), polyethylene terephthalate (Mylar), and the like reinforcing sheet material.

It is a particular object of the present invention to provide sheet material of the foregoing class wherein the thermoplastic film is formed with an imperforate continuous or substantially continuous, such as close dots or dashes, groove line which is relatively thinner than the remaining body portion of the thermoplastic sheet, whereby envelopes or sealed packages produced therefrom, while remaining imperforate and wholly sealed, are manually rupturable in a quick and convenient manner for access to the contents of the package.

All plastics whether formed by blow extrusion or roll extrusion or cast or die extruded are somewhat directionalized longitudinally. In addition, of course, some plastic sheet material is intentionally oriented by stretching either longitudinally or transversely or both. Thus, all plastic sheet material has some orientation and can be easily torn in the direction of orientation, but when one goes transverse or at an angle or at a curve thereto tearing is difficult and certainly not in a straight or desired line.

The present invention provides a thinned groove whereby tearing can be effected in a desired line or pattern which may be across the package, transversely of or at an angle to the direction of orientation, or in a curvilinear direction, and the relatively thinned groove line or lines can be in both or wholly in one layer within the package.

One specific embodiment of the present invention relates to the production of a rupturable rectangular envelope composed of two opposed thermoplastic sheet material layers open at at least one edge and adapted to be sealed thereat to provide an imperforate package, the sheet material of at least one of said layers being formed with a continuous or discontinuous rectilinear or curvilinear thinned groove line or lines in the body portion thereof in an area extending wholly within, or wholly or partly across, said layer and inwardly of the line or area of seal, generally intersecting the pattern of sheet orientation.

In another specific embodiment of the present invention both of the opposed thermoplastic sheet material layers of the envelope are formed with relatively thin grooved coinciding lines extending wholly or in part across the layers, said lines being disposed adjacent to a defining edge or corner of the envelope, and to at least one edge thereof inwardly of the line of seal, whereby the package may be very readily ruptured when desired in a predetermined manner.

As will hereinafter appear, the desired thinned groove line or lines may be formed in the sheet material during or after the sheet material is formed, and then cut and folded to individual packages.

As hereinbefore indicated, the sheet mtaerial and envelopes and sealed packages formed therefrom in accordance with the present invention are imperforate, that is to say, they distinguish from methods employed in the prior art wherein spaced perforations are employed to facilitate a linear tearing of the packages formed of the plastic sheet material, and thus permit the production of airtight sealed packages wherein the materials such as medical or dental appliances, food products and the like may be packed in a sanitary manner until use.

The present invention also distinguishes from the use of added tear strips known in the prior art and adhered to the plastic sheet material or secured under folds thereof as an opening aid.

The present invention also distinguishes from prior art packages which are edgewise notched as an aid for facilitating or starting tearing, the present invention being characterized by facilitation of wrap and simple means of opening the package without requirement of such prior art aids as notches, perforations or tear strips.

Other objects and advantages of the present invention, and its details of construction, will be apparent from a consideration of the following specification and accompanying drawings wherein:

FIG. 4 is a perspective view of another package which initially is wholly sealed, and provided with a rupturable line intermediate the confines of one ply or wall of the package, further illustrating the package partially open and a packaged article therein.

FIG. 5 is a fragmentary perspective view of another initially wholly sealed package, formed with a rupturable line of seal wholly within the confines of one wall or ply of the package, showing the package partially open on the rupturable line of seal.

FIG. 6 is a fragmentary perspective view of another wholly sealed package formed in accordance with the present invention, showing a rupturable line of seal.

FIG. 7 is another perspective view of the package of FIG. 6, showing the package partially open on its rupturable line of seal.

Figure 1:
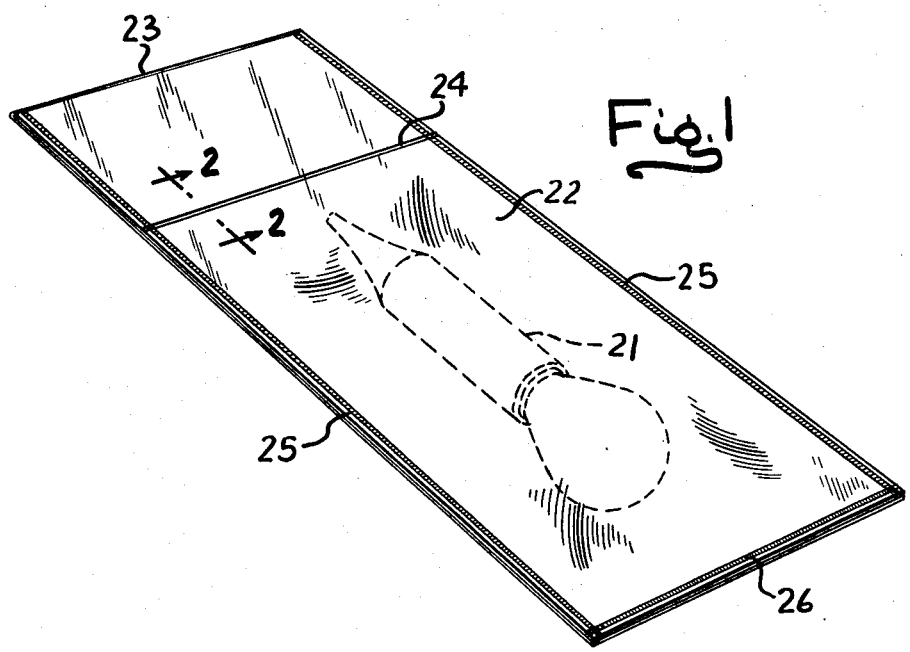
FIG. 1 is a perspective view of a rupturable, wholly sealed package formed in accordance with the present invention.

FIG. 1 shows a package formed from sheet material such as that produced from the tubing or from sheet material, and contains an article 21, such as a syringe, disposed within a fully sealed imperforate envelope. Here the envelope is comprised of two superimposed layers of thermoplastic sheet material each designated 22, folded at 23 in a manner so as to dispose a groove line 24 adjacent to, inwardly of, and parallel to the edge 23. The remaining edges forming the package shown in FIG. 1 may have been originally free and subsequently sealed together as by heat sealing at the opposed longitudinal edges 25, 25 and after disposing the article 21 therein fully sealed as by heat sealing at the remaining open edge 26.

Figure 2:
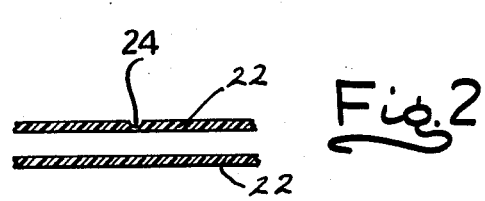
FIG. 2 is a fragmentary section on the line 2—2 thereof.
Figure 3:
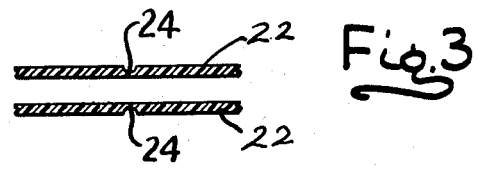
FIG. 3 is a similar section taken on the line 2—2 of FIG. 1 of a modified form.

As shown in FIGS. 2 and 3 it will be understood that the package shown in FIG. 2 can have one or an opposed pair of coinciding groove lines 24 on each of the superimposed layers 22 of which the package is composed.

The package shown in FIG. 1 can be readily ruptured along its thinned, score groove line 24 or opposed coinciding score groove lines 24, 24 by manually grasping the package at its opposed ends and on opposite sides of the score line or lines 24 and ruptured by a manual snap action which readily causes the package to separate on the score line or lines 24 providing access to the contents which were theretofore completely sealed in an airtight and sanitary manner such as is required for articles suitable for medical, food or other purposes.

It will be understood that when the packages are composed of tubing the tubing is flattened so as to dispose the groove lines adjacent and parallel to one of the folded edges of the tube the opposed ends are thereafter sealed by conventional electronic or heat sealing means to form a fully sealed package as is well understood in the art.

Referring to FIG. 4, the reference numeral 79 generally indicates a package having one wall 80 thereof formed with a weakened or rupturable line 81 wholly confined within the wall 80, the package being sealed or otherwise wholly closed at its ends 46, 46 and its sides 47, 47. By grasping the ends 46, 46 between the two hands the package may be caused to open on the line 81 by a snap motion, so as to give access to the contents 48 within the package.

A similar arrangement is shown in FIG. 5 wherein the package generally indicated as 49 is wholly sealed and the single surface or ply 50 thereof is formed with a weakened or rupturable line 51, which is here shown to be circular. By grasping the opposed ends of the package in a similar manner as described with respect to FIGS. 1 and 4, the package will snap open on the weakened groove line of seal 51, to give access to the contents of the package.

FIG. 6 illustrates another modification of a package generally indicated as 52, the package being wholly closed at its sides and ends and provided with rupturable lines 53, 53 extending across one corner of the package, the weakened rupturable groove lines 53 being in both the plies 54, 54 of the package and thus extending obliquely across one corner thereof. This corner may be readily sheared off on the line of seals 53 by either a snap motion as described with respect to FIG. 1 or by tearing it readily along this weakened groove line 53, to provide a spout for the contents of the package which is otherwise wholly sealed at its top and bottom edges 55, 55 and side edges 56, 56.

Thus, packages formed as shown, and which may comprise a single rupturable groove line as shown in FIGS. 2, 4 or 5, or an opposed pair of groove lines as shown in FIGS. 3 and 6, may be cut and sealed to form a vendable commodity such as an envelope open at one or more edges, and after an article is disposed therein the aforesaid open edges can then be sealed to form a completely sealed imperforate package.

The groove line or lines can be formed in the thermoplastic sheet materials employed in this invention by means of probes projecting into the path of the component flat sheet or tubular material as it is being extruded and before it hardens, or in the alternative the grooves can be formed in the thermoplastic tubing or sheet material by means of an electrically or otherwise heated bar.

Although I have shown and described the preferred embodiments of my invention, it will be understood that other modifications may be made in the details thereof without departing from its broader scope as comprehended by the following claims.

I claim:

1. A rupturable envelope adapted to be edgewise sealed to form an imperforate package comprised of at least one imperforate thermoplastic flexible sheet material layer formed with a relatively thinned groove line in the envelope body portion thereof comprising a line of predetermined opening extending inwardly of the area to be sealed.

2. A rupturable envelope adapted to be edgewise sealed to form an imperforate package comprised of two opposed imperforate thermoplastic flexible sheet material layers, at least one of said layers being formed with a relatively thinned groove line in the envelope body portion thereof comprising a line of predetermined opening extending inwardly of the area to be sealed.

3. A rupturable envelope adapted to be edgewise sealed to form an imperforate package composed of two opposed imperforate thermoplastic flexible sheet material layers, both of said layers being formed with a coinciding relatively thinned groove line in the envelope body portion thereof comprising lines of predetermined opening extending inwardly of the area to be sealed.

4. A rupturable imperforate wholly sealed package comprised of two opposed imperforate thermoplastic flexible sheet material layers defining an envelope, at least one of said layers being formed in the body envelope portion thereof with a relatively thinned groove line of predetermined opening extending inwardly of said seal, and an article sealed within said envelope.

5. A rupturable imperforate wholly sealed package comprised of two opposed imperforate thermoplastic flexible sheet material layers defining an envelope, both of said layers being formed in the envelope body portion thereof with a relatively thinned coinciding groove line of predetermined opening extending inwardly of said seal, and an article sealed within said envelope.

6. A rupturable imperforate wholly sealed package in accordance with claim 4 wherein said groove line extends in a direction of major orientation of said plastic sheet material.

7. A rupturable imperforate wholly sealed package in accordance with claim 4 wherein said groove line extends across the direction of orientation of said plastic sheet material.

References Cited by the Examiner

UNITED STATES PATENTS

| | | | |
|---|---|---|---|
| 2,189,431 | 2/40 | Moore. | |
| 2,851,212 | 9/58 | Parmer | 229—66 |
| 2,923,404 | 2/60 | Adell | 206—56 |
| 2,927,689 | 3/60 | Look | 206—63 |
| 2,973,131 | 2/61 | Meade et al. | 229—66 |

FRANKLIN T. GARRETT, *Primary Examiner.*